(No Model.)  7 Sheets—Sheet 1.
C. E. YETMAN.
COMBINED TYPE WRITER AND TELEGRAPHIC TRANSMITTER.
No. 565,128. Patented Aug. 4, 1896.
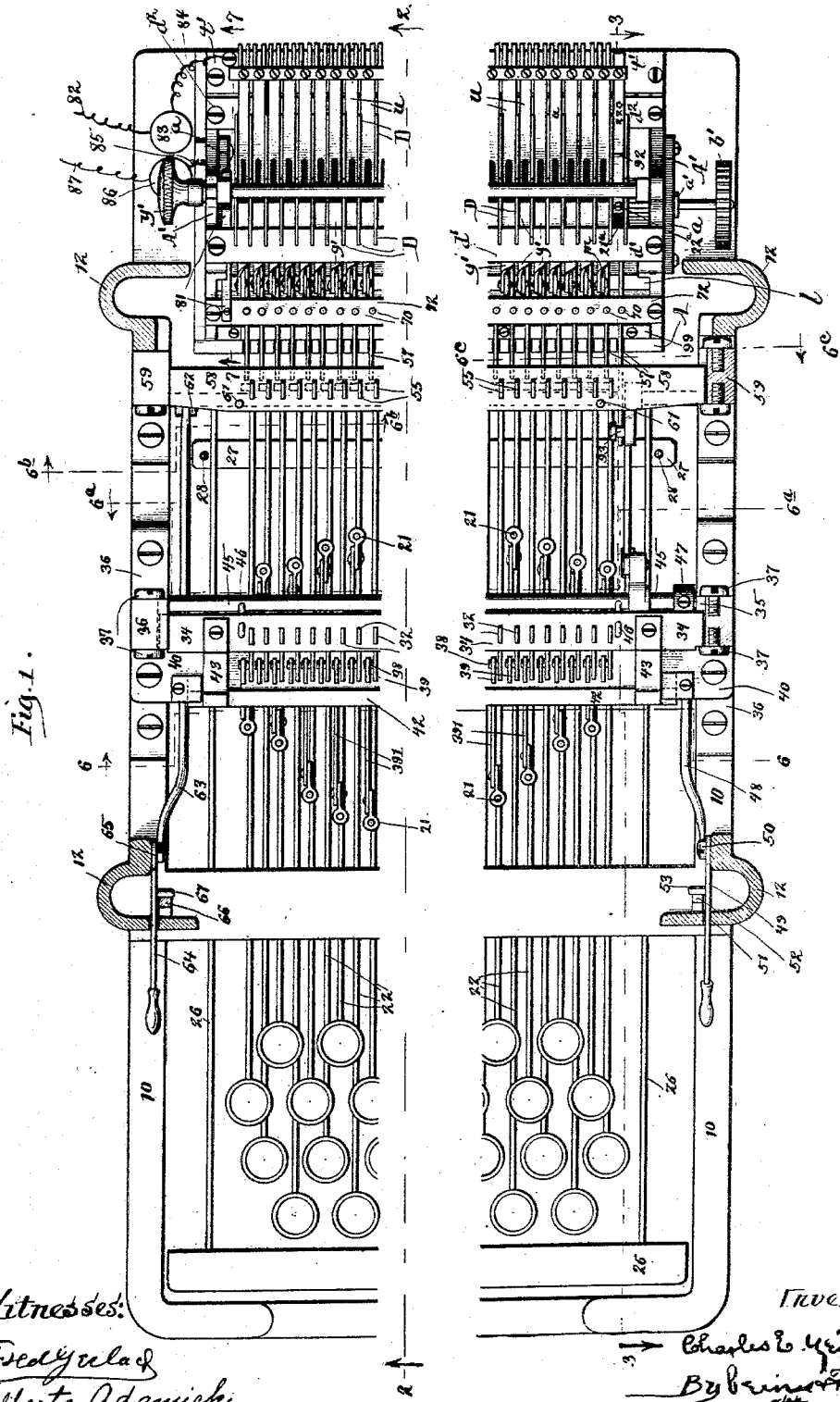
Witnesses:
Fred Gula
Alberta Adamick
Inventor
Charles E. Yetman
By Bruno Fisher
Attorneys.

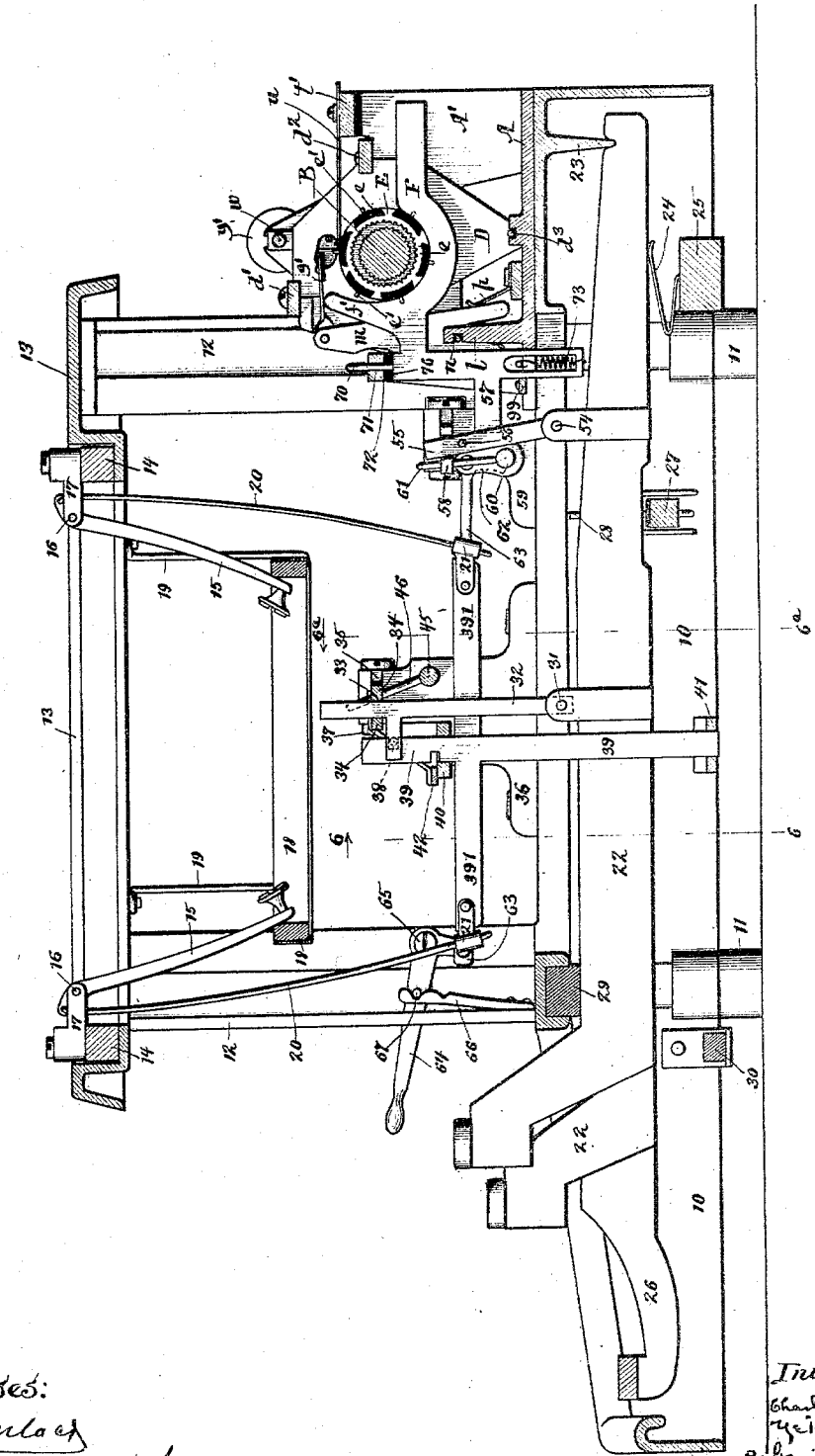

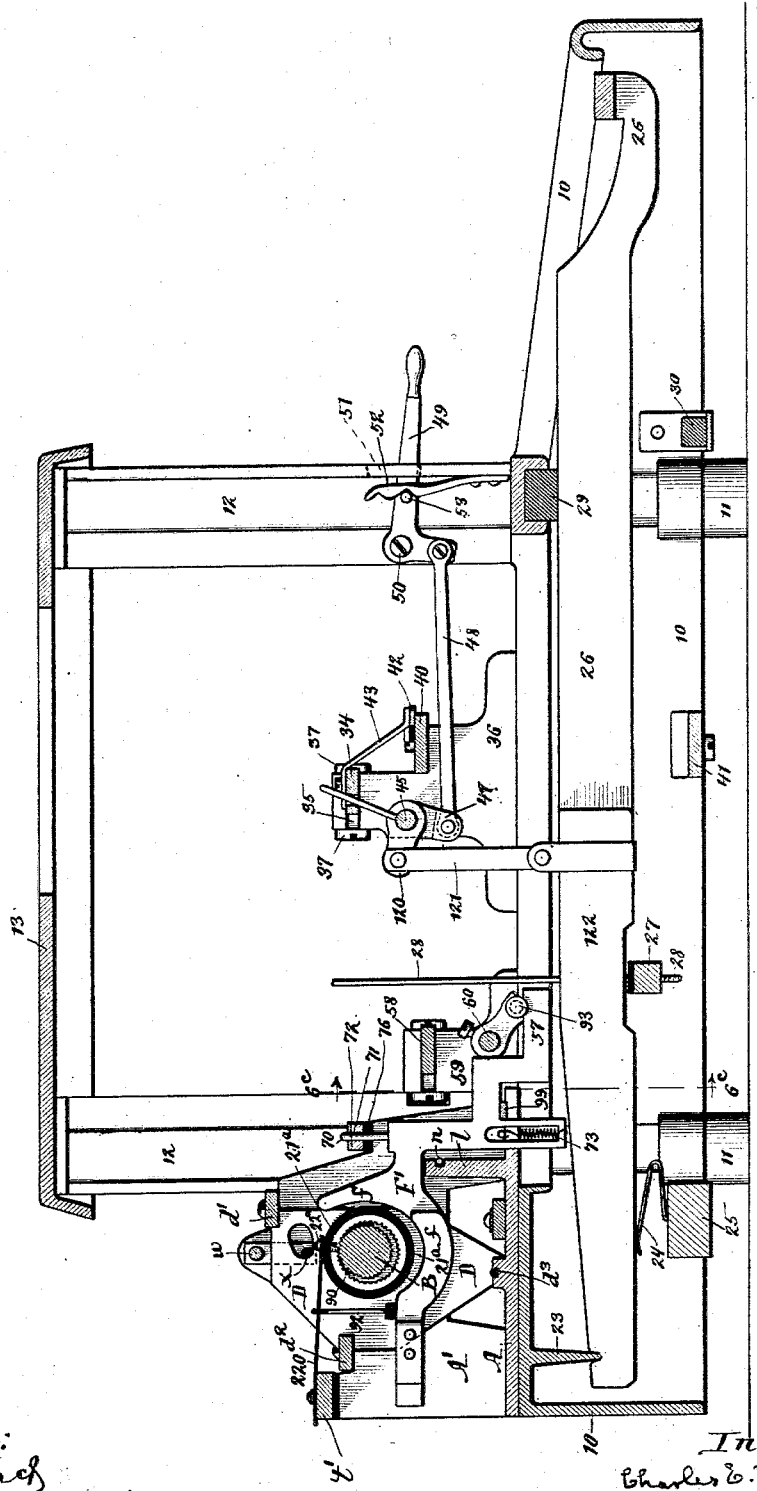

(No Model.)
C. E. YETMAN.
COMBINED TYPE WRITER AND TELEGRAPHIC TRANSMITTER.
No. 565,128.                                Patented Aug. 4, 1896.
7 Sheets—Sheet 4.
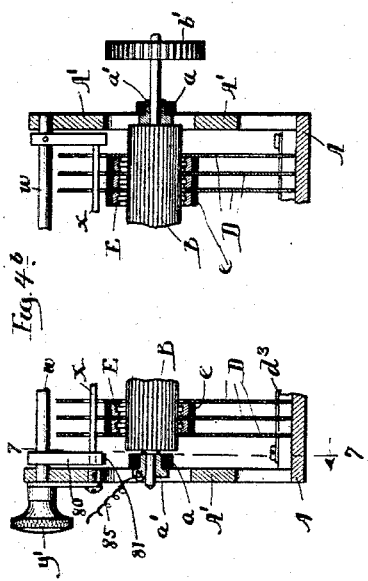
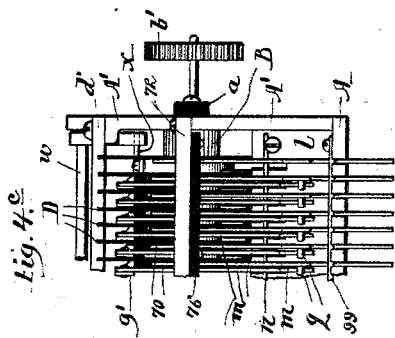
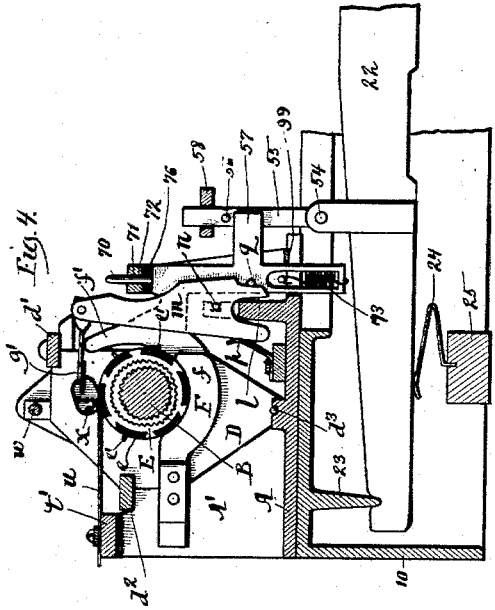
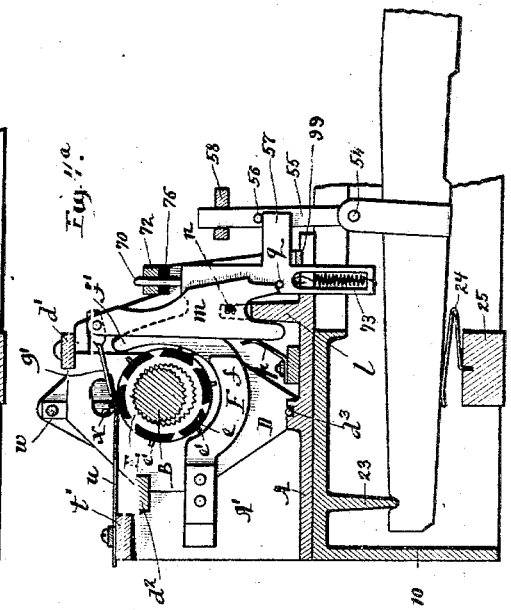
Witnesses:
Fred Gulag
Alberta Adamick
Inventor
Charles E. Yetman
By Louise Fisher
Attorneys.

(No Model.)
7 Sheets—Sheet 5.
C. E. YETMAN.
COMBINED TYPE WRITER AND TELEGRAPHIC TRANSMITTER.
No. 565,128.
Patented Aug. 4, 1896.
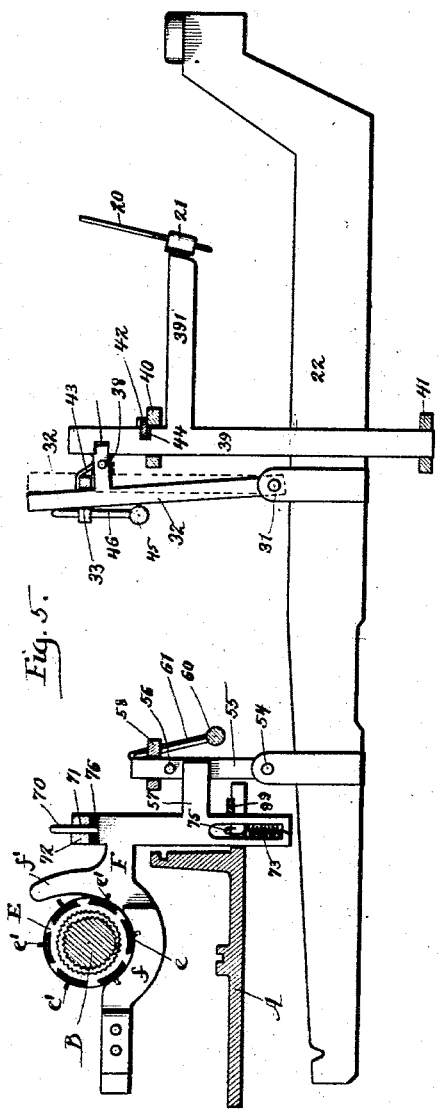
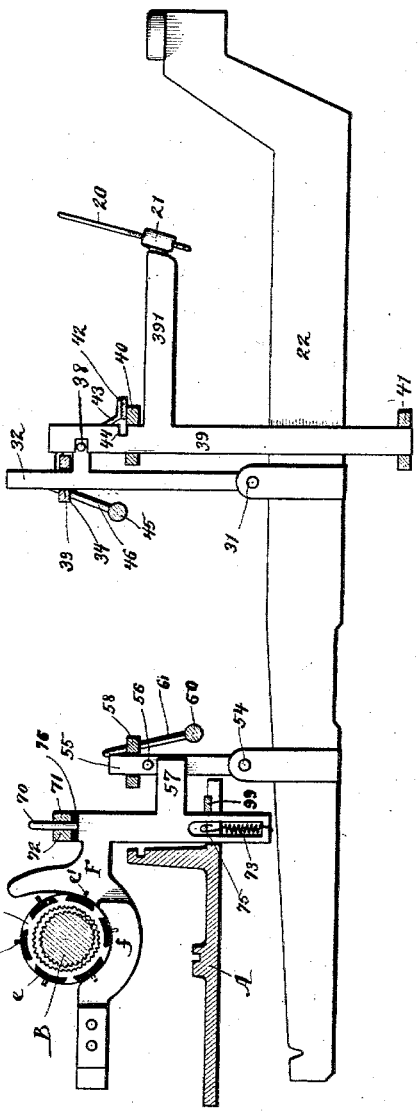
Witnesses:
Fred Gerlach
Alberta Adamick
Inventor:
Charles E. Yetman
By [signature]
Attorneys.

(No Model.) 7 Sheets—Sheet 6.
C. E. YETMAN.
COMBINED TYPE WRITER AND TELEGRAPHIC TRANSMITTER.
No. 565,128. Patented Aug. 4, 1896.
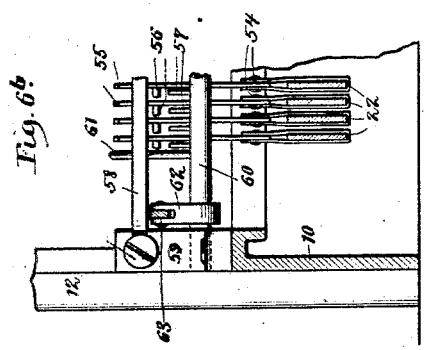
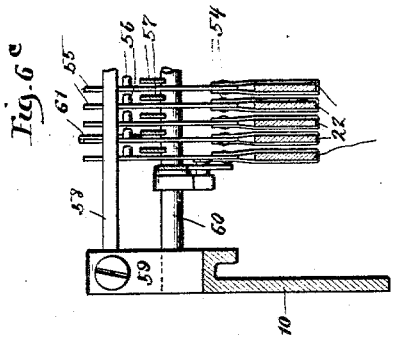
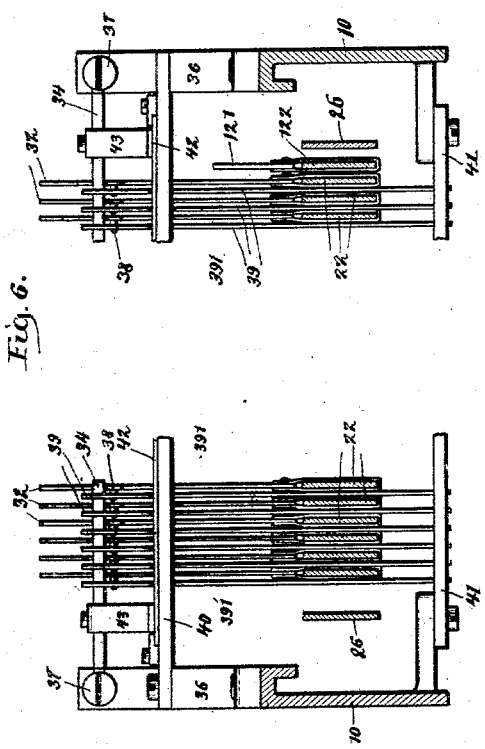
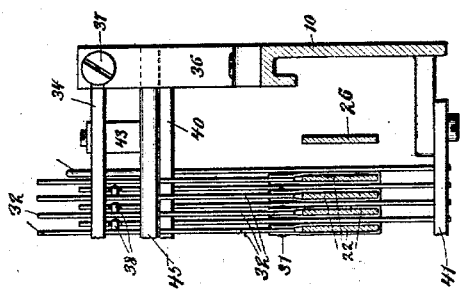
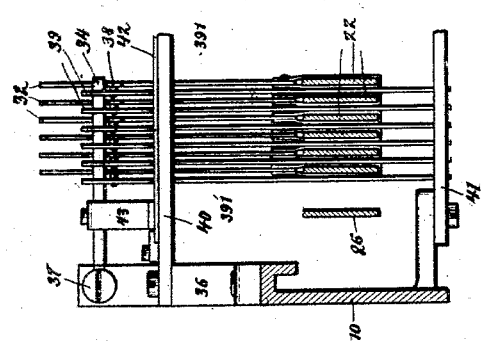
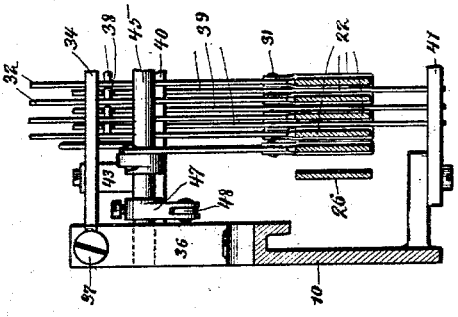
Witnesses:
Fred Gerlach
Alberta Adamick.
Inventor:
Charles E. Yetman
By _____ Fisher
Attorneys.

(No Model.) 7 Sheets—Sheet 7.
C. E. YETMAN.
COMBINED TYPE WRITER AND TELEGRAPHIC TRANSMITTER.
No. 565,128. Patented Aug. 4, 1896.
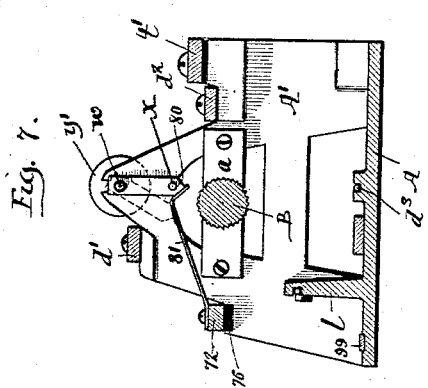
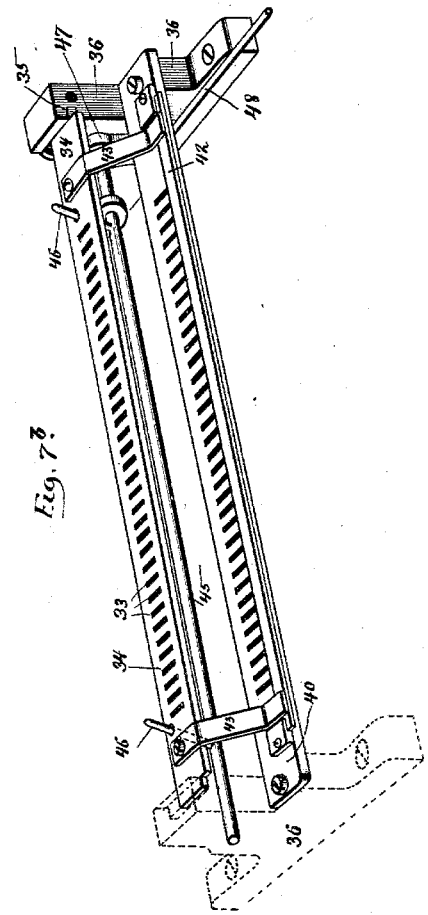
Witnesses:
Fred Gerlach
Alberta Adamick
Inventor:
Charles E. Yetman
By Venice Fisher
Attorneys.

UNITED STATES PATENT OFFICE.

CHARLES ELMER YETMAN, OF OAK PARK, ILLINOIS, ASSIGNOR TO THE WORLD FLASH COMPANY, OF CHICAGO, ILLINOIS.

COMBINED TYPE-WRITER AND TELEGRAPHIC TRANSMITTER.

SPECIFICATION forming part of Letters Patent No. 565,128, dated August 4, 1896.

Application filed September 7, 1895. Serial No. 561,849. (No model.)

*To all whom it may concern:*

Be it known that I, CHARLES ELMER YETMAN, of Oak Park, Cook county, Illinois, have invented certain new and useful Improvements in a Combined Type-Writer and Telegraphic Transmitter, of which the following is hereby declared to be a full, clear, and exact description.

The invention designs to unite an ordinary type-writer machine having a series of finger-keys to actuate the familiar type-bars with an electric code-transmitter governed from the same keys.

The improvement permits the type-writer and the transmitter to be used separately or together and is of especial benefit, e. g., in instances where a skilled telegraph employee may be afflicted with "operator's cramp." The transmission of the code-signals is rendered uniform and distinct, while with the type-writer in play a record is kept to verify the contents of the messages sent. The separate use of the type-writer enables the operator to transcribe the code-signals received by him into regular printed form as rapidly as he can read the signals and manipulate the type-writer keys. To insure accuracy and legibility, there is a growing tendency for the receiving-operator to employ the type-writer in reducing the messages to written form. The present invention affords a machine ready at hand for the purpose, and the training which enables it to be thus skilfully used will suffice, besides, (by play upon the same finger-keys,) for the quick and distinct transmission of despatches in electric code. The operator is wholly relieved from the fatigue and muscular "cramps" which the persistent strain in use of the ordinary hand-transmitter frequently imposed.

The details of structure adapted for the practice of the improvements in the selected style of the device shown by the drawings will appear from the description following and the invention be thereafter more particularly pointed out by claims at its conclusion.

In the drawings which accompany like parts bear like designation throughout.

Figure 1, Sheet I, is a plan view at the two sides of the machine, the mid-portion from front to rear and the upper works of the type-writer being removed. Fig. 2, Sheet II, is a longitudinal section at line 2 2 of Fig. 1. Fig. 3, Sheet III, is a like section looking in direction of the arrow at line 3 3 of Fig. 1; Fig. 4, Sheet IV, a view in transverse section at the transmitter with the several parts in state of rest; Fig. $4^a$, a like view with the parts in action; Fig. $4^b$, a longitudinal vertical section at opposite ends of the transmitter; Fig. $4^c$, a detail front view at the right-hand end of the transmitter; Fig. 5, Sheet V, a detail section view of the "key-action" common to the type-writer and the transmitter with the type-writer out of play; Fig. $5^a$, a like view with both type-writer and transmitter in play. Fig. 6, Sheet VI, is a vertical transverse section of the key-action bank at opposite ends of the machine on line 6 6 of Fig. 2. Fig. $6^a$ is a like view at line $6^a$ $6^a$ of Fig. 2, looking toward the front of the machine. Fig. $6^b$ is a detail view, in vertical transverse section, on line $6^b$ $6^b$, Figs. 1 and 2, looking toward the rear; Fig. $6^c$, a like view on line $6^c$ $6^c$, Figs. 1 and 3, looking toward the front. Fig. 7, Sheet VII, is a detail section view at the left inner side of the transmitter-frame on line 7 7 of Figs. 1 and $4^b$. Fig. $7^a$ is a plan view of one of the "shifters" at the transmitter detached; Fig. $7^b$, a perspective view of the keeper and its adjuncts interposed in the key-action between the key-levers and the jacks for the type-bars.

The drawings display the invention properly adapted in detail for use in conjunction with a type-writer of the general Remington style; but it will be understood that this particular style of machine is selected for illustration merely, since the improvements are not confined thereto and can be applied to various forms of the ordinary type-writer without essential departure from the invention.

The skeleton base-frame 10 is of usual rectangular form and is furnished with eye-sockets beneath to receive the rubber plugs or feet 11, upon which the machine rests. Upright standards 12 extend at opposite corners from the base and sustain the top plate or deck 13, across which travels the carriage (not shown) for the familiar cylindrical platen. A ring 14 in the depressed seat of top plate 13 affords a mount for the several type-bars 15 set in circular range about the same and pivoted, as at 16, to the separate lugs 17 therefor. Rest-pad 18 for the type-bars is carried as usual by pendents 19 from ring 14, while links 20, jointed freely to the separate type-bars 15, back of pivots 16, extend thence below and are united by knuckle-joint 21 to the key-action. The individual keys 22 are here shown of familiar lever form arranged in regular series across the front of the machine in parallel relation and extending back to the fulcrum-ledge 23 on base-frame 10. Springs 24, located between the several keys 22 and a cross-piece 25 of the base, maintain the levers in normally uplifted position, Figs. 2 and 3, in readiness to be struck by the operator. The U-like spacer 26, Figs. 1 and 3, incloses the bank of keys in ordinary fashion, and like them fulcrums at its opposite legs upon ledge 23 to actuate the universal bar 27. Said bar 27 extends across the machine beneath the spacer 26 and by arms 28 is joined to the customary feed-escapement (not shown) for the carriage. Buffers 29 30, arranged across the width of the machine near the front above and below levers 22 26, ease the shock when said levers are struck and then released. As thus far detailed the features of the device are common to various sorts of type-writer now in customary use.

Instead of uniting the type-bar links 20 directly to the keys 22, as in usual practice, there is interposed between these parts a supplemental structure by means of which the type-bars can be thrown into or out of action at will.

The key-levers, as presently shown, serve conveniently in dual rôle to actuate, first, the printing-bars of the type-writer, and, second, the shifter-switches for the series of code-symbols at the electric transmitter. No objection to the simultaneous use of both type-writer and transmitter exists, and the invention contemplates that the two devices shall often be employed in unison. Yet occasions may frequently arise when type-writer and transmitter are selected for separate use, i. e., one without the other. Since the same series of key-levers determine the unison play of both devices, the peculiarities in structure now to be detailed enable either the type-writer or the electric transmitter to be thrown into or out of connection with the key-levers, so that the two may be used jointly or singly as the operator elects. There is no interdependence between the two devices except that each is controlled from the same bank of key-levers, and it is obvious that save for ease in "touch" the release of the type-writer from play is of no especial moment. The transmitter would perform its functions unchangeably whether the type-bars were joined permanently to the key-levers or were cast off therefrom, as contemplated.

Pivoted, as at 31, near the mid-length of the several key-levers 22 is the parallel set of trippers 32, which project above through slots 33, Fig. 7$^b$, of a cross-plate or keeper 34. Said keeper 34 moves slightly in the grooves or ways 35, formed in the opposite brackets 36, bolted on the base-frame 10. Screws 37, carried by brackets 36 near grooves 35, determine the play of the sliding keeper 34 and allow the same to be removed from position when desired.

Each tripper 32, by a side pin 38 thereon, engages at will with a companion notch formed in the adjacent edge of the series of upright jacks 39. The jacks 39 are mounted in parallel at the front of the trippers 32, but alternate jacks have front and rear extensions 391, to which are attached the knuckle-joints 21 for the links 20 of the several type-bars. The jacks are free to rise and fall slightly in the slots of the upper and lower guide-bars 40 41. Guide-bar 40 is carried, Fig. 7$^b$, on ledges of the opposite side brackets 36, while the lower companion guide-bar 41 is fastened conveniently to the base-frame 10. A safety-plate 42, sustained by arms 43, Figs. 2, 3, and 7$^b$, from keeper 34 and movable therewith, enters the notches 44 of the adjacent edge of the jacks 39 and thus locks the jacks against chance displacement at such time as the trippers 32 are withdrawn by keeper 34 from engagement with said jacks. To govern the throw of the keeper 34 common to the tripper-set, a rock-shaft 45, mounted in bearings upon the opposite brackets 36, is furnished with pins 46, which project loosely through holes, Fig. 7$^b$, in the keeper 34. A crank-arm 47, fastened to rock-shaft 45 near the right inner side of the machine, is united by pitman 48 to bell-crank lever 49, pivoted, as at 50, to the inner face of one of the front standards 12. The arm of the bell-crank lever 49 passes through a slot 51 in the standard, Fig. 1, and is guided thereby. A cam-spring 52 encounters pin 53, Figs. 1 and 3, upon the bell-crank lever and thus locks said lever with its adjuncts in assigned position.

When the machine parts are set as shown by Figs. 2, 3, and 5$^a$, a stroke by the operator on any of the individual key-levers will cause the corresponding type-bar to quickly rise and make its imprint. Movement from lever 22 is by tripper 32, side pin 38, jack 39 and its extension 391, link 20, to the type-bar. By lifting the free end of bell-crank lever 49 at the front of the machine the pitman 48, through crank-arm 47, turns rock-shaft 45 and causes pins 46 thereon to slide the keeper 34 and safety-plate 42, attached thereto, a slight distance toward the rear. This backward play releases tripper-pins 38 from engagement with jacks 39, and simultaneously brings the safety-plate 42 within the row of notches at said jacks. The parts have now assumed the relation shown by Fig. 5, in which the type-bars no longer respond to the play of the key-levers 22. The levers are free to actuate the electric transmitter solely while any minor displacement of the vertical jacks 38, due to the jar of the machine or chance contact with adjacent key-levers, is prevented by the safety-plate 42, which locks the jacks in position to engage anew with tripper-pins 38 when bell-crank lever 49 is reversed and the type-writer again brought into action.

It will be noted that the several trippers 32 are joined to the respective key-levers 22 at essentially the same distance from the fulcrum-ledge 23, while the corresponding jacks 39 have their alternate extensions 39¹, at front and rear, of practically equal length, measured from side pins 38 on trippers 32 to the point of union with links 20 for type-bars 15. Hence it is that the weight or resistance to be overcome, on application of the power of the key-levers 22 at pivots 31 of trippers 32, is substantially equal for each type-bar to be actuated. The touch of the keyboard thus becomes uniform throughout. Owing to the even throw of the several key-levers 22 26, rendered feasible as just detailed, the buffer 30 comes into effective play to relieve the shock at the limit of descent, which might not be if the several levers differed in respect to the distance to be traversed before the descent was accomplished. Since the throw of the several key-levers is practically equal, and the universal bar 27 at a uniform distance from tripper-pivots 31 for the application of the power, it is further obvious that no nice adjustment of the under edges of said key-levers where they contact with the universal bar is requisite. They need simply to be flat or of substantially even level along the row, which could not be if different key-levers were compelled to descend unequal distances in making a "stroke" of their type-bars. Much filing and scraping of the key-levers at the "adjusting-room" of the factory are in consequence wholly avoided by the construction stated. On throwing the mechanism intermediate the key-levers and the type-bars out of action, as by disconnecting trippers 32 from jacks 39, it is clear that tampering with the machine is attended with less risk. None of the type-bars respond to the key-action, and if two levers be struck simultaneously there is no interference or collision between their type-bars at the "platen."

Toward the rear of the machine each key-lever 22 carries pivoted thereto, as at 54, a connector 55, having side pin 56, designed to encounter the heel 57 of a switch appliance or shifter F, extended into the path thereof. The parallel set of connectors 55 project above through slots of a sliding throw-off 58, which consists of a transverse metal plate sustained at its ends in the grooves of brackets 59, mounted upon the sides of base-frame 10. Upon the same brackets, beneath the throw-off 58, is journaled the rock-shaft 60, Figs. 1, 2, and 5, having drive-pins 61 extended therefrom and loosely through holes in the throw-off 58, whereby the throw-off may be shifted to bring the studs 56 on connectors 55 into or out of range with the heels of the parallel series of shifters F on the transmitter. A crank-arm 62 on rock-shaft 60 connects by links 63, Figs. 1 and 2, with bell-crank lever 64, pivoted, as at 65, on the inner face of the left-hand front standard 12. The free end of the lever extends forward through a slot in the standard. Cam-spring 66 encounters stud 67 on the bell-crank and locks said crank at assigned position. By the means detailed it is clear that the individual key-levers 22 are brought into or out of action with the corresponding series of shifters on the electric transmitter, as the operator may desire.

In general structure the electric transmitter here shown is substantially the same as that disclosed by my Letters Patent No. 534,025 for automatic telegraphing-machines, dated February 12, 1895.

It will be understood that the present improvements are not restricted thereto, the particular transmitter being selected for illustration merely, and because it exhibits an effective means for the practice of the invention.

Upon the top of main frame 10 and snugly received between the rear standards 12 is the base-plate A for the transmitter, which latter is thus free to be attached or detached from the type-writer proper, as desired. Side standards A', connected by lugs with the plate A, carry bearers $a$, Figs. 4ᵇ and 7, of insulating material, e. g., vulcanized fiber, which receive the hub-boxes $a'$ for the journals of the fluted shaft B. Shaft B extends across the machine and affords a mount for the set of switch appliances such as are requisite to transmit a complete system of conventional code-signals. At one end, Figs. 1 and 4ᵇ, the shaft B carries a pinion $b'$, usually of vulcanized fiber, and which engages with the gear-train (not shown) of a suitable motor designed to drive the shaft at uniform speed.

A series of shifters F, of irregular shape and designed to control the diversion of the electric current through any of the several switches or symbol-disks appropriate to the individual signals in the code system, is mounted in parallel array near the front of the transmitter-frame. The several shifters are set within slits in base-plate A, and by means of pins 70, projected through holes 71 in the transverse guide 72, secured at its ends to standards A', the shifters are kept upright and have a limited vertical play. Springs 73, seated within a slot at the lower leg of each shifter F, stretch between the set of shifters and a cross-rod 75, upon which the springs are strung. The springs hold the several shifters in normal relation, Figs. 2, 5, and 5ᵃ, snugly against the buffer-strip 76 beneath guide 72, and thus in position for stud-pin 58 on connector 55 to strike the heel 57 of the adjacent shifter F and depress the shifter slightly against the stress of spring 73, if the suitable key-lever be brought into play.

Owing to the upright or straight-line play of each shifter in the structure, as shown, it is clear that less movement of the individual key-lever is needed in forcing the shifter to traverse a definite distance than would be requisite if the shifter had a fulcrum-bearing at the rear, corresponding to that of key-levers 22, as at 23. Because of this it becomes feasible to arrange the connector mechanism which extends between the key-levers and the shifters farther back, *i. e.*, nearer the key-lever fulcra, and thus to render the touch of the keys less heavy. In a subsidiary sense the right-line shifter is therefore more advantageous in use than if a "pivotal" shifter were adopted as a substitute, although, generally stated, the two forms of shifter are equivalents.

Between the several shifters are set the partitions D, usually of vulcanite, the same being seated at their upper ends within the slits of comb-bars $d'$ $d^2$, that extend across the machine (affixed to standards A') and at their lower ends within corresponding grooves in the base-plate A. A tie-rod $d^3$, passing through the feet of the partitions, holds them in place.

The several partitions have holes therein, through which the rotating driver B passes, while around the said driver and between the partitions is mounted the series of symbol disks or rings E. The inner rim of each ring is fluted to engage at will with the fluted driver, and there is a central groove in the ring-fluting, Fig. $4^b$, to afford clearance for the dust and to insure a balanced contact when the ring and driver are engaged.

On the outer rim the several metal rings E carry insulating-blocks $e$ at proper intervals. The insulation varies in keeping with the conventional signal for the letter, character, or word to be transmitted by the particular ring. The drawings, Fig. 2, show a ring designed to send one dot, which by the Morse code signifies the letter "E." It is also apparent that the ring referred to has the single dot repeated six times about its periphery. Space-pins $e'$ project from the ring-rim between each dot set. These serve as trips to check the motion of the ring at the insulation-block on completion of the signal, as presently detailed.

Ordinarily the circuit-rings E stand disengaged from the driver B, but rest instead upon the reciprocating shifters, which are conveniently of rounded contour to conform to the ring-rim. In such shape the shifters act as a brake to quickly arrest the revolution of the ring on release from the driver. A wing $f$, projected from the shifter, Fig. $7^a$, and of like rounded contour, furnishes a broad seat for the ring and proper clearance for the space-pins on the ring, which are conveniently set at the median line of the rim.

Under stress of the springs 73 the shifters F generally stand in uplifted position and carry with them the series of circuit-rings which are thus free from the driver B and do not revolve. At the front, shifters F are kept upright by guide-pins 70 and retainer-bar 99, which latter bears against the edge of the shifter-legs.

Ranged across the base-plate A near its front is a standard $l$, having notches therein to receive the forked ends of the series of latches $m$. There is one latch for each of the shifters. The latches are pivotally set upon a rod $n$, common to all of them, and carried by the standard $l$. Plate-springs $p$ bear upon the several latches, below the pivot-rod $n$, and maintain them upright with the rear fork abutting against the standard. Each shifter F is furnished with a lateral stud $q$, Figs. 4 and $4^a$, to engage with the front fork of the adjacent latch. When the shifter is depressed, the stud $q$ rides along the latch, turning slightly on its pivot $n$ against the stress of the spring $p$.

The descent of the shifter causes its arm $f'$ to be withdrawn from beneath the trip-pawl $g'$, which is pivoted to the upper end of the latch $m$. The said pawl drops, accordingly, against the face of the circuit-ring E and rests in the path of its space-pins $e'$. The descent of the shifter necessarily lowers the circuit-ring E, which it controls, and brings such ring into engagement with the rotating driver B. At once the circuit-ring begins to revolve, and so persists for a distance sufficient to transmit the desired signal.

When the transmitter is in use, the electric circuit can be traced from the battery (not shown) by wire 82 and binding-post 83, wire 84, Fig. 1, to the metallic plate $t'$, insulated from the frame. The plate $t'$ carries a series of spring contact-pieces $u$, forked at their free front ends and brought to bear lightly upon the several circuit-rings E. When the metal part of the ring E makes contact with the spring-piece $u$, riding thereon, the circuit is closed thereby and may be traced further from ring E by shifter B, metal hub-box $a'$, Fig. $4^b$, wire 85, winding-post 86, Fig. 1, and line-wire 87 to the distant station. The successive dots and dashes to complete the signal are produced by variations in length of the metallic parts of the ring having the insulator-blocks between them.

As the signal is finished, the next space-pin $e'$ on the ring E encounters the trip-pawl $g'$ and forces it forward, thereby rocking the latch $m$ on its pivot $n$ until the heel of the said latch withdraws from the stud $q$ on the shifter F. The said shifter is thus free to rise again to its normal position under stress of its spring 73, and in rising it lifts the circuit-ring E out of engagement with the shaft B and arrests its movement, while the arm $f'$ of the said shifter raises the pawl $g'$ clear of the ring. All of the parts are thus restored to the normal state in readiness to ablow for transmission of the next character or, as may be requisite, to repeat the same character over again.

If multiple repetition of the same signal is desired, as in calling a distant station, this can be effected by holding the trip-pawl $g'$ out of action, clear of the path of the space-pins on the circuit-ring E. A pivot-bar $w$, arranged above the rings, carries a transverse rod $x$, which extends through the partitions D across the transmitter in position to come within the path of the series of pawls $g'$. The button $y'$ on the end of bar $w$, Figs. 1 and $4^b$, serves to turn said bar and thus bring its cross-rod $x$ in position to prevent drop of any of the pawls $g'$. Hence when the selected shifter is depressed and held down by its latch the individual pawl $g'$ pertaining to the latch $m$ must stay uplifted, by which expedient the circuit-ring E continues to revolve on the driver B until the rod $x$ is withdrawn at the will of the operator to allow the pawl $g'$ to descend and effect the release of latch $m$, shifter F, and ring E. A cam-piece 80, carried by the pivot-bar $w$, Figs. $4^b$ and 7, bears at its V-end against spring 81 to hold the bar $w$, together with its cross-rod $x$, in assigned position.

Provision is made for the arrest of the rotating driver B and to establish a short circuit around the machine. The end ring 90 of the series of rings, Fig. 3, is of metal, but has a rim $21^a$ of insulating material, e. g., gutta-percha. A metal screw $22^a$ in contact with the ring attaches a spring-piece 220 to the rim $21^a$. At its opposite end the said spring-piece is fastened to the circuit-plate $t'$. The shifter F' to control the short-circuit ring is mounted as usual and near the rear, Fig. 3, carries a trip 92, which overlies the spring-piece 220 to force it with its ring 90 downward when the shifter F' is depressed. The result is to bring the metal ring 90 against shaft B, thereby dogging the shaft against rotation and closing the electric circuit through said shaft and its hub-box $a'$, Fig. $4^b$. To depress the end shifter F', the rock-shaft 60, Fig. 3, carries a crank-stud 93, which bears against the heel 57 of the shifter and thus forces the shifter down when the bell-crank lever 64, Figs. 1 and 2, is manipulated by the operator.

If it is desired to use the transmitter solely without disturbing the type-writer or its carriage, this can be simply accomplished by the provision shown at Fig. 3. The rock-shaft 45 has a crank-arm 120, united by pivoted link 121 with stub-lever 122. Said lever is set at the end of the row of individual key-levers 22 and like them fulcrums on ledge 23 and has a reaction spring 24. On shifting the rock-shaft 45 to disengage the series of trippers from their jacks, as already detailed, said rock-shaft, through its arm 120 and link 121, depresses stub-lever 122 until the universal bar 27 is encountered and forced down to its limit. Being thus detained in depressed position, the universal bar 27 is free from the stroke of the several key-levers, and hence these can be used at will in operating the electric transmitter, while the type-writer carriage (the feed of which is controlled from the universal bar) remains at a standstill.

Obviously the details of structure can be varied according to the skill of the mechanic without departure from the essentials of the invention. Thus in lieu of "levers" for the finger-keys other substitutes can be employed which are included by the term "levers" as employed herein.

Having thus described the invention, what I claim as new, and desire to secure by Letters Patent, is—

1. The combination with the individual finger-key and with the transmitter switch-shifter corresponding thereto and actuated thereby, of a mechanical connector device suitably extended between said key and shifter to interlock the same and a throw-off under the operator's control to cast said connector at will and free the shifter from its finger-key, substantially as described.

2. The combination with the individual finger-key and with the transmitter switch-shifter corresponding thereto and actuated thereby, of the mechanical connector pivoted to said finger-key and interlocking with its shifter and a throw-off under the operator's control to cast said connector at will and free the shifter from its finger-key, substantially as described.

3. The combination with the finger-key and with the separate transmitter switch-shifter corresponding thereto and actuated thereby, of the mechanical connector extended from said key and interlocked in loose one-way engagement with said shifter, during descent of the key, whereby said key moves the shifter in unison from the normal while both return separately thereto, substantially as described.

4. The combination with the individual finger-keys and with the corresponding series of transmitter switch-shifters of the set of mechanical connectors extended between and interlocking the respective keys and shifters to actuate any selected key and shifter together and a throw-off under the operator's control to simultaneously disunite in common plural shifters from their finger-keys and connectors, substantially as described.

5. The combination with the individual finger-keys and with the series of transmitter switch-shifters corresponding thereto and actuated thereby, of the mechanical connectors uniting each shifter with its finger-key, and a throw-off common to several connectors, and under the operator's control to cast said connectors in unison at will and free the shifters from their finger-keys, substantially as described.

6. The combination with the individual finger-keys and with the corresponding series of transmitter switch-shifters, of the set of separable mechanical connectors extended between the respective keys and shifters to actuate any selected key and shifter together, and a throw-off common to several connectors and under the operator's control to cast said separable connectors in unison at will and free the shifters from their finger-keys, substantially as described.

7. The combination with the individual finger-keys, of the series of transmitter switch-shifters corresponding thereto, mechanical connector devices extended from said keys to the shifters to actuate the selected shifter in unison with its companion key and a throw-off within the operator's control to simultaneously disunite plural finger-keys from the corresponding switch-shifters, substantially as described.

8. The combination with the series of finger-keys and with the corresponding series of transmitter switch-shifters actuated thereby, of the mechanical connectors pivoted to the respective keys and interlocking with the shifters and a throw-off under the operator's control common to several connectors to cast the same at will and free the shifters from the keys, substantially as described.

9. The combination with the individual key-levers, of the series of upright transmitter switch-shifters corresponding thereto and actuated in right-line movement thereby, the mechanical connectors uniting each shifter with its lever and a throw-off common to several connectors and under the operator's control to cast said connectors in unison, at will, and free the shifters from their key-levers, substantially as described.

10. The combination with the individual finger-keys and their type-bars, of the corresponding series of switch-shifters at the electric transmitter, the mechanical connectors extended from said keys and interlocked in loose one-way engagement with said shifters during descent of the respective keys, the rotating shaft having circuit-make-and-break devices thereon severally under control from the separate shifters and a set of latches, one for each shifter, and released separately by the rotating shaft to restore the selected shifter to normal position free and distinct from its finger-key, substantially as described.

11. The combination with the individual finger-keys and their type-bars, of the corresponding series of switch-shifters at the electric transmitter, the mechanical connectors extended from said keys and interlocked in loose one-way engagement with said shifters during descent of the respective keys, the rotating shaft having circuit-make-and-break ring sustained loosely and intermittently thereon under control from said shifter, a latch to hold said shifter depressed and having a trip-pawl thereon projected by said shifter into the path of the make-and-break ring and engaging at intervals therewith to restore the selected shifter to normal position free and distinct from its finger-key, substantially as described.

12. The combination with the individual finger-keys and with their type-bars of the electric transmitter having a series of shifters corresponding to the several keys, a mechanical connector extended between each shifter and its key, and a throw-off common to several connectors whereby said shifters may be engaged with or disengaged in unison from the finger-keys appropriate thereto, substantially as described.

13. The combination with the individual finger-keys and with their type-bars of the electric transmitter comprising a rotating shaft, a set of symbol-disks actuated thereby and a series of shifters corresponding to the several finger-keys and respectively controlling the separate transmitter-disks, a mechanical connector extended between each shifter and its finger-key, and a throw-off common to several connectors whereby said shifters may be engaged with or disengaged in unison from the finger-keys appropriate thereto, substantially as described.

14. The combination with the individual finger-keys and with their type-bars of the electric transmitter comprising a rotating shaft, a set of symbol-disks mounted loosely about said shaft and carried intermittently thereby, a series of shifters corresponding to the several finger-keys and respectively sustaining the separate symbol-disks free from the shaft, a mechanical connector extended between each shifter and its key and a throw-off common to several connectors to engage or disengage them in unison, substantially as described.

15. The combination with the individual key-levers, the series of trippers carried thereby and the keeper common to said trippers to shift the same, of the series of jacks engaged by said trippers, the pivoted type-bars and the links uniting said bars and jacks, substantially as described.

16. The combination with the individual key-levers having pivoted trippers thereon, of the series of jacks to control the type-bars, the keeper common to said trippers and suitable means for moving said keeper whereby the trippers are thrown into or out of engagement with the jacks, substantially as described.

17. The combination with the individual key-lever and its type-bar of the rotating shaft at the electric transmitter, the symbol-disk mounted loosely about said shaft and carried intermittently thereby, a switch-shifter sustaining said disk free from the shaft and connector mechanism extended from the key-lever and engaging said shifter loosely to throw the same whereby the lever and shifter move in unison from normal position but return separately thereto, substantially as described.

18. The combination at the electric transmitter, with a series of switch-shifters and with the rotating shaft having circuit-make-and-break devices thereon, of a set of latches to engage with and hold said shifters depressed, the trip-pawls carried thereby to encounter the rotating shaft and the "repeat" bar extended at will into the path of the trip-pawls to detain the same from contact with said shaft, substantially as described.

19. The combination with the individual key-levers and with the type-bars operated therefrom of the intermediate mechanism connecting said levers and type-bars and suitable means common to separate companion parts of said mechanism to throw the same in unison whereby said key-levers and type-bars are engaged or disengaged from action, substantially as described.

20. The combination with the individual key-levers and with the series of trippers to actuate the several type-bars of the keeper common to said trippers, a lever to separately depress the universal bar of the machine, and means to shift said keeper and separate lever in unison, substantially as described.

21. The combination with the series of trippers for the type-bars and with the keeper common to said trippers, of the universal spacing-bar for the machine, a separate lever to depress said universal bar, and suitable means intermediate the keeper and lever to shift the same in unison, substantially as described.

22. The combination with the individual key-levers and with the switch-shifters at the transmitter operated therefrom of the intermediate mechanism connecting said levers and shifters and suitable means common to separate companion parts of said mechanism to throw the same in unison whereby said key-levers and shifters are engaged or disengaged from action, substantially as described.

23. The combination with the individual finger-keys and with the corresponding type-bars actuated therefrom, of the series of upright reciprocating jacks interposed between said keys and bars and suitable means extended oppositely from said jacks and uniting the same with said keys and bars respectively, substantially as described.

24. The combination with the individual finger-keys and with the corresponding type-bars actuated therefrom, of the series of upright reciprocating jacks located between them, the links pivotally joining said jacks and type-bars and suitable means extended oppositely from said jacks to unite them to the finger-keys at practically uniform distances throughout, substantially as described.

25. The combination with the individual finger-keys and with the corresponding type-bars arranged in basket form and actuated from said keys, of the set of upright reciprocating jacks located intermediate said keys and bars, the links pivotally uniting said jacks with the type-bars and suitable devices extended oppositely from said jacks to unite them with the finger-keys, substantially as described.

26. The combination with the key-levers and with the corresponding type-bars arranged in basket form and actuated from said levers, of the set of upright reciprocating jacks located intermediate said keys and bars, the links pivotally uniting said jacks with the type-bars, the trippers extended oppositely from said jacks and united to the respective key-levers at practically uniform distances from the fulcra thereof, and the universal bar operated by said levers, substantially as described.

27. The combination with the key-levers and with the corresponding type-bars arranged in basket form and actuated from said levers, of the set of upright reciprocating jacks located intermediate said keys and bars, the links pivotally uniting said jacks with the type-bars and the trippers extended oppositely from said jacks and united to the respective key-levers at practically uniform distances from the fulcra thereof, substantially as described.

CHARLES ELMER YETMAN.

Witnesses:
 CALEB G. ENSIGN,
 NEWTON D. BAILEY.